Figure 5:
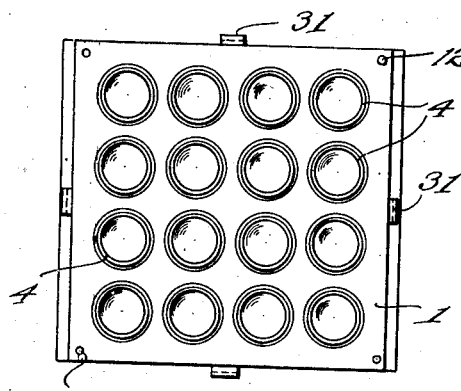

March 2, 1926.  
F. T. ROBERTS  
1,575,388  
METHOD AND APPARATUS FOR MAKING HOLLOW RUBBER ARTICLES  
Filed Oct. 16, 1922  3 Sheets-Sheet 1
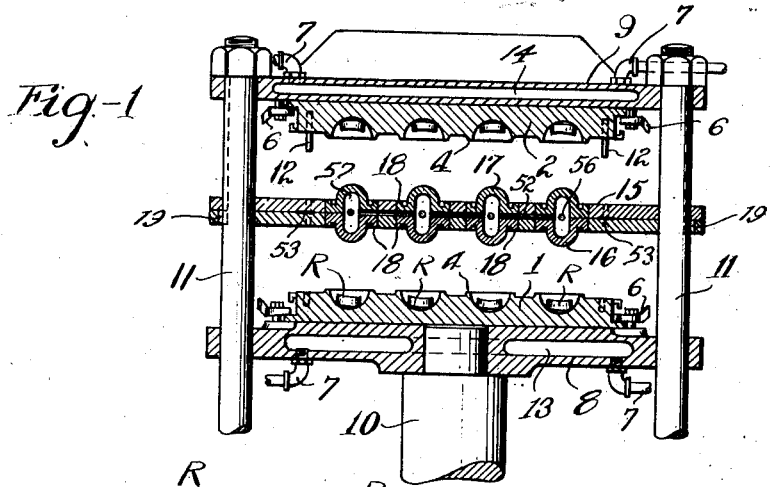
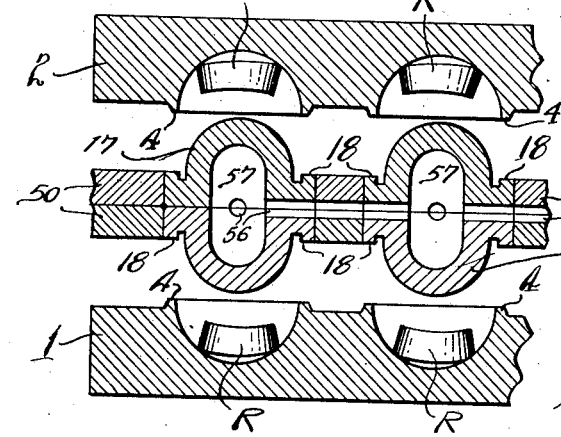
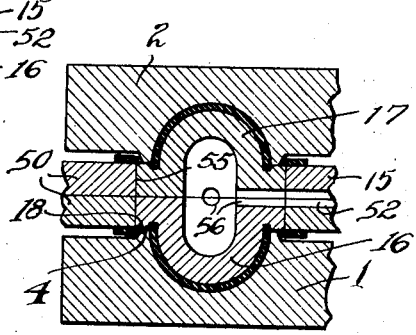
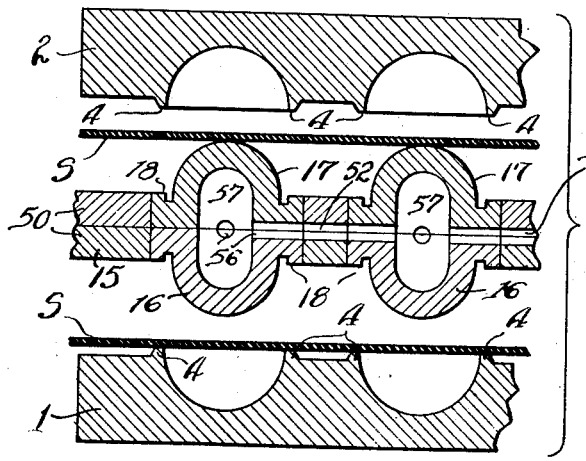
INVENTOR  
Fred Thomas Roberts,  
BY Bakis Macklin  
ATTYS.

March 2, 1926.
F. T. ROBERTS
1,575,388
METHOD AND APPARATUS FOR MAKING HOLLOW RUBBER ARTICLES
Filed Oct. 16, 1922
3 Sheets-Sheet 2

INVENTOR
Fred Thomas Roberts
BY Baker & Macklin
ATTYS.

March 2, 1926.

F. T. ROBERTS 1,575,388

METHOD AND APPARATUS FOR MAKING HOLLOW RUBBER ARTICLES

Filed Oct. 16, 1922     3 Sheets-Sheet 3

INVENTOR.
Fred Thomas Roberts,
By Bates & Macklin,
ATTYS

Patented Mar. 2, 1926.

1,575,388

UNITED STATES PATENT OFFICE.

FRED THOMAS ROBERTS, OF UPPER MONTCLAIR, NEW JERSEY, ASSIGNOR TO PARAMOUNT RUBBER CONSOLIDATED, INC., OF TUCKAHOE, NEW YORK, A CORPORATION OF DELAWARE.

METHOD AND APPARATUS FOR MAKING HOLLOW RUBBER ARTICLES.

Application filed October 16, 1922. Serial No. 594,731.

*To all whom it may concern:*

Be it known that I, FRED THOMAS ROBERTS, a citizen of the United States, residing at Upper Montclair, in the county of Essex and State of New Jersey, have invented a certain new and useful Improvement in Methods and Apparatus for Making Hollow Rubber Articles, of which the following is a full, clear, and exact description, reference being had to the accompanying drawings.

This invention relates to the manufacture of hollow rubber articles and particularly to inflated balls such as tennis balls, play balls, etc., permanently filled with compressed fluid. In the making of tennis balls, for example, exacting requirements must be met to produce balls meeting the specifications imposed by the National Lawn Tennis Association, as to uniform pressure, uniform size, weight, etc. In manufacturing tennis balls by methods heretofore used, it was difficult or expensive to meet these requirements. One of the older methods used consists of assembling by hand four pieces of calendered rubber stock to form the ball, and providing on the interior of the ball a rubber plug which will not cure or vulcanize by the heat required to subsequently vulcanize the ball. This plug acts as a valve through which a hypodermic needle may be thrust. The ball is vulcanized in a mold and is forced to the walls of the mold by internal pressure created by a heat-expanding substance placed within the ball before closing. After vulcanization, a hypodermic needle is forced through the wall of the ball and through the plug to give the internal pressure of air in this well known manner.

This process, however, results in the walls of the balls being uneven in thickness, ridges and seams are formed where the pieces are joined, which render the ball unbalanced, to make it impossible to put in as high internal pressure as may be desired.

A more recent method for the manufacture of tennis balls, as well as many other forms of balls and other hollow articles, is shown, described and claimed in my Patent No. 1,146,523, granted July 13, 1915. This is commonly known as the "trapped inflation" method. According to this method the walls of the ball are formed between dies and then semi-cured before being joined together, and they are brought together in a surrounding atmosphere of compressed air entrapping this compressed air, which serves for vulcanization and permanently remains in the ball. This process produces satisfactory results but is comparatively slow and expensive.

The general object of the present invention is to eliminate the difficulties of previously used methods and to accomplish greater uniformity and economy in the manufacture of such articles. This present invention has some of the advantages of the method of the patent above named and eliminates the step of inflation and affords a saving in the apparatus employed.

A specific object of the invention is to provide a very simple and effective process and apparatus, adapted first, to completely form parts of an article, such, for example, as two hemispheres of a ball by mechanical pressure which renders the walls more dense, that is, less porous than where pneumatic means are used for forming or seating the articles. The article is also comparatively firm and adapted for transference without distortion to a separate vulcanizing mold if desired.

Another advantage of the present invention is the parts of the article are formed to size in the molds in which they may be brought together, whereby all of the parts are uniform, even, and have accurate seams.

In carrying out this invention, I provide a pair of mold members having cavities and an intermediate heated mold member having oppositely facing protuberances complementary to the cavities and adapted to force the stock into the cavities and accurately form the same under heavy pressure and slightly vulcanize it to cause it to hold its shape. This intermediate member is then removed and the trimmings of material constituting the overflow, or in case the parts are formed from sheets pressed into the cavities, the intervening portions of the sheets surrounding the cavities, are removed and may be reused. The mold members are then brought together after the insertion of a chemical suitable to create internal pressure during the subsequent vulcanizing heat and to maintain sufficient pressure through the life of the article.

By this invention, the use of the same mold members for forming, uniting and vulcanizing the articles eliminates the step of transferring the articles from forming to vulcanizing molds. It also eliminates the step of entrapping compressed air as formerly used in my process above referred to.

While the preferred method and best advantage derived from this method is by forming, joining and vulcanizing the parts of the article in the same mold, a similar result can be accomplished, though not as efficiently, by forming the parts of the articles in mold members, transferring them to other molds and joining them together in these molds, and either vulcanizing them in the molds used for joining, or using other molds for vulcanizing purposes.

The formed parts may also be joined together in cavities of the proper size set between an ordinary punch press or any rotary machine, and then may be removed from these joining molds to any suitable type of vulcanizing molds, and, in this case, after the parts of the article are joined together they may be placed in the curing molds with the seams on the same plane as the face of the mold or with the seams crosswise.

Still other specific objects include the construction of the male and female mold members to provide for effective cutting off of the surplus stock around the mold, and at the same time provide a joint between the cavities of sufficient width to securely hold the article against the internal vulcanizing pressure. I may buff off the edges of the formed parts of the article by the passing of a rapidly revolving buffing roller across the tops of the mold cavities, thus producing a roughened surface of uniform height on the edges of each hemisphere, or other formed halves. By similar means, if desired, I may treat the edges with vulcanizing cement.

The above and other objects are made more fully apparent in connection with the illustrative apparatus, by which I carry out the process of the present invention, and to which the following description refers.

Figure 6:
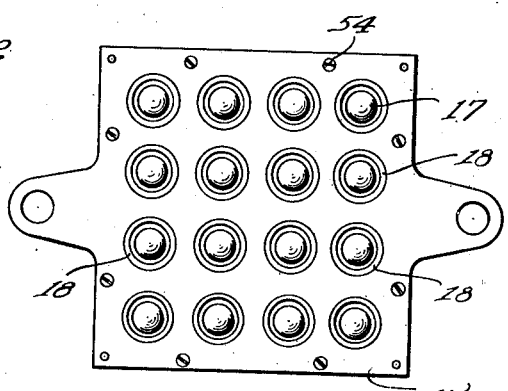
Figure 7:
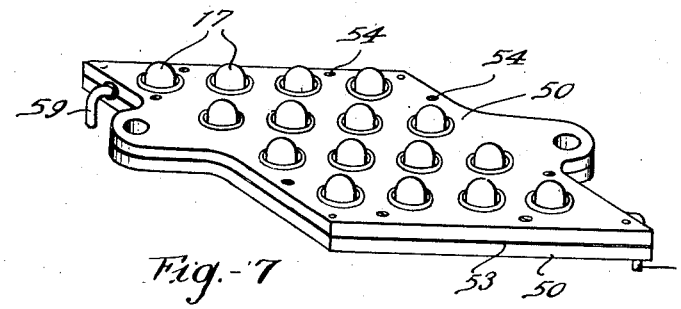
Figure 8:
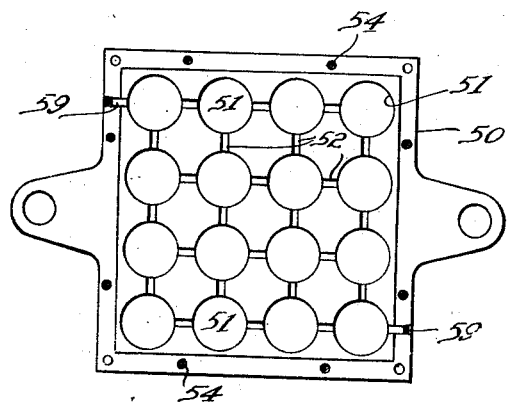
Figure 9:
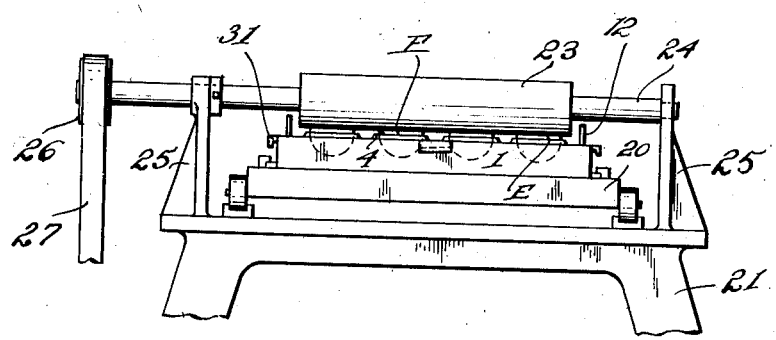
Figures 10, 11:
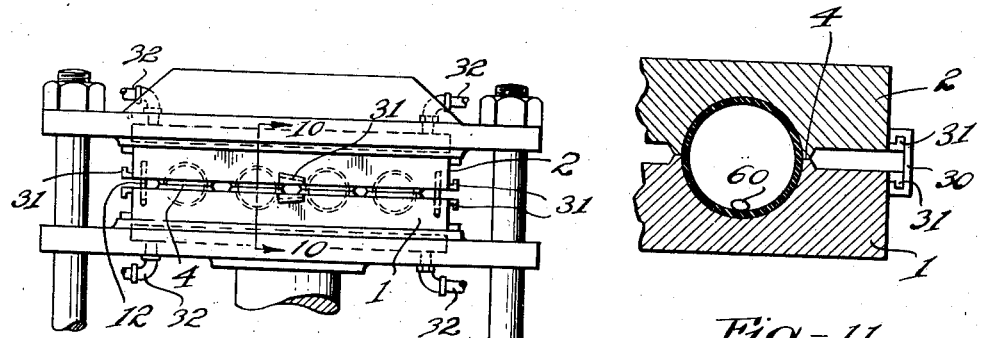
Figure 12:
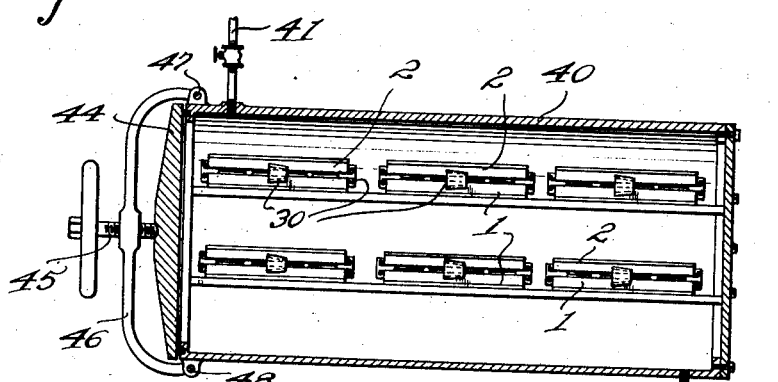

In the drawings, Fig. 1 is a vertical sectional view through the mold members shown as carried by a suitable press for bringing them together and illustrating raw rubber pellets, from which the parts of the article are formed, in position in the cavities; Fig. 2 is an enlarged sectional view of these same mold members; Fig. 3 is a similar view illustrating the use of sheets from which the parts of the article are formed; Fig. 4 is a sectional detail showing the mold members brought together completing the formation of the parts of the article and showing the manner of severing the formed hemispheres from the surplus stock; Fig. 5 is a plan view of one of the mold members, provided with a plurality of cavities; Fig. 6 is a similar view of the forming plate provided with protuberances at either side thereof; Fig 7 is a perspective of the forming plate; Fig. 8 is an inside plan of either of the halves of the forming plate; Fig. 9 is an elevation illustrating more or less diagrammatically a carrier for moving mold plates with the articles therein under a buffing roll; Fig. 10 shows the press members brought together with the intermediate male members removed; Fig. 11 is an enlarged detail of the mold members in this position, showing the article with its chemical pellet to create the internal pressure either in this press or a separate vulcanizer, and Fig. 12 illustrates a separate vulcanizing chamber containing a number of the mold members locked together after removal from the press.

Referring to the drawings by the use of reference numerals, 1 and 2 indicate the lower and upper mold members provided with cavities, which in the case of balls, are preferably hemispherical in each mold, the surface of the molds are cut away around the cavities leaving the ribs 4 narrow enough to form cutting edges, and yet of sufficient width to form meeting surfaces when the molds are together.

These mold members may be held in position by any suitable means. I have shown side rails engaged by clamps 6 upon platens 8 and 9, of a hydraulic press; the platen 8 being movable toward and away from the stationary platen by a plunger 10 and guided by the vertical rods 11 to which the upper platen is rigidly secured. Dowel pins 12 serve to cause accurate registration of the mold members. Suitable means are employed for heating the molds 1 and 2, as for instance by providing steam spaces 13 and 14 in the respective platens, with which communicate suitable piping indicated at 7 for conveying steam to and from the platens.

An intermediate forming mold member is shown as consisting of a horizontal body 15 provided with protuberances 16 and 17 adapted to project into the cavities of the plates 1 and 2. These projections are shown as slightly smaller than the cavities and they are surrounded by annular ribs 18 which coact with the ribs 4 surrounding the cavities, thereby serving as cutting edges to sever the surplus stock or "trim" from the article parts formed in the mold members.

This body 15 is shown as guided by the rods 11 and is supported when not in use by keys 19 engaging slots in the rods.

The intermediate forming member is made hollow and provided with steam connections so that it may be readily maintained hot. As a convenient way to effect this, I make the member of two corresponding plates 50, shown separated in Fig. 8, which plates are secured together, and I form the protuberances as separate hollow inserts mounted in these plates. More specifically, each plate 50 has holes 51 drilled through it, these holes being connected by grooves 52. Two plates so arranged are placed face to face upon an intermediate marginal gasket 53 which may seat in a slightly cut down portion of the plates and then these plates are brought tight together to compress the gasket and are held by suitable means, as for instance the screws 54, the portions of the plate between the grooves 52 abutting each other. The protuberant inserts may have cylindrical walls 55 and these are forced by pressure snugly into the cylindrical openings in the plates. The inserts have in their bases grooves 56 communicating with their hollow interiors 57 and registering with the grooves 52 in the holding members. Suitable steam connections 59 leading to and from the grooves in the plates provide for keeping the plates hot.

It will be understood that by maintaining the mold members and the intermediate forming member hot, I slightly vulcanize or semi-cure the rubber stock in the same cavities in which they are formed. Such semi-curing is just sufficient to cause the articles to hold their shape, and does not interfere with their subsequent complete vulcanization to form a tight seam. The cavities and piping also enable water to be subsequently passed into the parts to cool the mold and forming members if desired.

Within the cavities, I have shown (in Figs. 1 and 2) the raw rubber stock which is to form the article parts, in the present case, the hemispheres. These rubber slugs may be readily formed by accurately cutting off predetermined short lengths of rubber from a continuous cylinder formed on a tubing machine. The slugs or pellets of rubber, designated R, are slightly against the mold cavity when placed, thus causing them to adhere slightly, whereupon the three-part mold members may be brought together in the press thus forcing the rubber to fill the hemispherical cavities between the male and female surfaces.

As the parts of the mold are caused to meet along the ribs 4 and 18, the surplus rubber is severed or trimmed from that in the cavities. This position of the mold and the severing of the rubber is illustrated in Fig. 4. The parts are then separated and the mold plate 15 removed, the surplus rubber or "trim" is removed and saved.

When the molds are separated to remove the forming plate the rubber tends to adhere to the cavities, and to assure this I may cover the forming parts 17 with soft soap or soap stone.

The mold members 1 and 2 may then be brought together causing the edges of the hemispheres to unite. The protuberances 17 are surrounded by channels inside of the ribs 18 which allows the rubber formed in the cavities to project slightly out of the cavities. These projecting edges may be accurately buffed off to prepare the edges for uniting, and avoid the possibility of any distortion of the rubber at the seam.

The means for buffing off this surplus rubber and preparing the edges of the hemispheres may be a device such as illustrated in Fig. 9 wherein a slide 20 is mounted on a frame 21, and provided with suitable means for positioning the mold members either 1 or 2 as in the press. A buffing roll 23 is shown as mounted on a spindle 24 supported in brackets 25 rising from the frame. This spindle may be provided with a pulley 26 by which a belt 27 may revolve the buffing roll. It will be seen that by moving the slide to the mold member with the edges of the hemispheres H projecting therefrom as shown at E, the buffing roll may be caused to remove the surplus rubber substantially down to the ribs 4, thus presenting an even but roughened edge on the hemispheres, which may be treated by applying vulcanizing cement assuring a more perfect union at the seam. If desired, this application of cement may be made by such a slide and a cement applying roll, so that the application of cement may take place at once in all of the parts in one of the molds with the members therein as it is moved under the roll. The mold members may now be replaced in a press like that of Fig. 1 without the plate 15 as shown in Fig. 10. The parts are now firmly pressed together causing the surface of the ribs 4 to tightly meet and causing the edges of the hemispheres to unite. Before bringing these parts together, a suitable chemical is placed within the articles as will be presently more fully described.

The articles may be vulcanized in the same press by steam admitted to the platens through pipes 32 (Fig. 10) or they may be clamped together and transferred to a separate vulcanizer. Such clamping may be readily effected by female wedge members 30 engaging male wedge ribs 31.

When these mold plates are clamped together, they may then be removed from the press and placed in a suitable vulcanizer, such as indicated in Fig. 12, consisting of a steam-tight chamber 40, supplied by steam through a steam controlled passage or pipe 41 and provided with suitable outlet 42. The front of the chamber may be closed by a removable cover on the door 44 and clamped by a screw 45 provided with a suitable hand wheel, the screw extending through a yoke 46 pivotally secured at 47 to the frame of the chamber, and adapted to be locked by a suitable pin or other removable means as at 48.

Instead of using the pellets or slugs, I may use sheets of raw rubber as shown at S in Fig. 3, one sheet being laid over the mold member 1 and the other on top of the projections 17 of the forming mold member 16, after which these parts are brought together to the position shown in Fig. 4. The result of forming the hemispheres being the same as before. After separation of the members the hemispheres remain in the cavities and the surplus of the sheets are simply removed and may be reused. To cause the hemispheres to hold their shape and position in the molds, I prefer to slightly cure them by the expedient of previously heating the mold members 1 and 2, before placing the rubber thereon. Thus when the sheets or slugs are placed in position and these hot mold members brought together, the rubber in the cavities is very tightly compressed, rendering the parts forming the walls of articles very dense, as compared to the stretching of the rubber into its seat which occurs when fully or partially seating the rubber by a vacuum. This stretching naturally causes something of a separation of the molecules and renders the rubber more porous. When the parts are brought together, they are held there momentarily, under pressure, and the mold members being hot gives the rubber in the mold members something of a slight cure,— just enough to cause the rubber to hold its shape. The trim of the rubber of the surplus is not materially effected by this heat and therefore is not damaged for reuse.

In carrying out my process to comply with all of the requirements of accuracy, uniformity, etc., of the final results when making balls, such as tennis balls, for example, one of the important things is to create an internal pressure in each ball of exactly the amount desired. By my method this pressure serves to maintain the articles or balls distended during vulcanization and thereafter affords the permanent internal pressure providing the resilience for playing purposes. This pressure is obtained by the use of a chemical substance adapted to generate a permanent gas, when subjected to the curing heat, and I desire to use the chemical in such form that accurate amounts may be placed within the articles with the greatest convenience. To this end, I may employ a mixture generating a nitrogen gas, for example, according to the following formula:

$$NH_4Cl + NaNO_2 = NaCl + 2N + 2H_2O.$$

I prefer to make an accurate mixture of this chemical in a suitable quantity and form the same into pills or pellets of uniform size and content, each one of which is of sufficient size to generate the exact amount of gas required for vulcanization and permanent resilience. Thus before closing the molds, after the formation of hemispheres, I place one of these pills, indicated at 60 in Fig. 10, within the rubber-lined cavities. Now upon the application of curing heat, the chemical action takes place generating the gas which remains permanent at a predetermined pressure. As the walls of the article have been rendered dense by the formation pressure and the slight curing given them, as described, they remain dense throughout the vulcanization and thus retain the internal pressure over a longer period of time than is possible in the absence of this formation of the walls of the article under pressure.

Summarizing the use of my apparatus, and steps of my process, I first place sheets or slugs of rubber R as illustrated in Figs. 2 and 3 in the molds which have been previously heated by suitable means. The molds are then brought together with a press, such as shown in Fig. 1. The rubber is caused to fill the cavities between the male and female members and the surplus is severed by the meeting edges 4 and 18, and the parts are held in this position long enough for the heat of the molds to give the rubber a set while under this mechanical pressure. The molds are then separated and the protruding edges of the hemispheres may be buffed to facilitate the uniting of the edges, the buffing being readily accomplished by the revolving roller under which the molds with the rubber therein are passed by the use of moving slide or carrier 20 of the device shown in Fig. 9. The edges may be otherwise prepared to assure a more complete union, if desired, although the necessity for this depends upon the nature of the rubber used. Before bringing the parts together the gas generating pills 60 are placed, one in each lower cavity. The mold parts are now brought together in the press as shown in Fig. 10, where the edges 4 meet on a surface of sufficient width, being slightly wider than as though it were a cutting edge only, to effectively close the cavity in which the article is held, so that the internal pressure generated by the curing heat may not distort the ball or cause any fins thereon at the meeting edges. After a suitable curing period, the balls are removed from the moles and may be suitably treated to complete the article, for example, by placing the usual felt cover thereon for use as a tennis ball.

Thus by my process, I am enabled by very simple and effective series of steps to form articles under mechanical pressure, give them a slight vulcanization, which is preferably less than the usual "semi-cure", then retain them in the same mold and cause them to unite to complete the article and thereafter vulcanize the article with or without removal from these molds. Thus the parts of such a hollow article having permanent inflation are formed and united in the same mold, and various advantages result, not only in accomplishing economy, but I am enabled to produce a superior article.

I claim:—

1. A method of making permanently inflated hollow rubber articles, consisting of slightly vulcanizing rubber composition, while mechanically forming the walls of the article under pressure and of continuously holding the articles in the same mold member, uniting them and vulcanizing them while giving them a permanent inflation.

2. A method of making permanently inflated hollow rubber articles, consisting of slightly vulcanizing the rubber composition during mechanical formation of the walls of the article under pressure and while continuously holding them in the same mold member, uniting them and vulcanizing and giving them a permanent inflation.

3. The method of making hollow rubber articles consisting of slightly vulcanizing a rubber composition during mechanical formation of the walls of the article under pressure, and completing the vulcanization without removing from these molds.

4. The method of making hollow rubber articles consisting of forming parts of the wall of the article in molds having male and female portions pressed together onto the rubber stock, heating both surfaces of the rubber while so held, removing the male portion and bringing the mold members having the parts therein together to unite the parts at their edges, and then vulcanizing them while so held.

5. The steps in the process of making hollow rubber articles comprising shaping the desired article from unvulcanized stock in a mold heated sufficiently to slightly vulcanize the formed part, bringing the parts of the article together in the molds in which they were formed to unite them edge to edge and subsequently vulcanizing the article.

6. The method of making hollow rubber articles consisting of forming the parts of the article in mold members having male and female portions, forming the raw rubber stock to the desired shape under pressure, removing the male portions and buffing the edges of the article while in the cavity and thereafter uniting the article parts and vulcanizing them.

7. The method of making hollow rubber articles consisting of shaping the article from unvulcanized stock by the use of heated mold and core members, removing the core, retaining the shaped parts in the mold sockets and uniting the edges of the parts and vulcanizing the articles in the same mold.

8. The method of making hollow rubber articles consisting of shaping two or more parts of the article with mold and core members under pronounced mechanical pressure, at the same time heating the shaped parts sufficiently to slightly vulcanize them whereby they hold their shape, retaining the shaped parts in the mold sockets, removing the core members, placing a gas-forming chemical within the article to create a vulcanizing pressure, vulcanizing the articles in the same mold sockets, and retaining a permanent pressure therein.

9. The method of making hollow rubber articles consisting of completely shaping two parts of an article in mold sockets with mold cores, forcing the stock in shape and seating it in cavities, buffing the edges of the parts while in the cavities, charging the interior of the article with material to produce an inflating gaseous medium, bringing the parts of the article together, and vulcanizing the article in the same cavities in which they are formed, and retaining the gaseous medium therein.

10. The method of making hollow rubber articles comprising shaping two parts of an article by seating it in cavities, buffing the edges of the article parts while in the cavities and thereafter bring the cavitary members together to join the parts of the article.

11. The method of making hollow rubber articles comprising shaping two parts of an article by seating it in cavities, heating it sufficiently to make it hold its shape, buffing the edges of the article parts while in the cavities, and thereafter bringing the cavitary members together to join the parts of the article.

12. The method of making hollow rubber articles comprising mechanically forcing raw rubber stock into mold sockets, heating the stock while in the sockets sufficiently to make it retain its shape, buffing the edges of the said parts while in the sockets, thereafter bringing the parts together to join them to each other, and thereafter vulcanizing the article.

13. The method of making hollow rubber articles consisting of shaping the desired article of unvulcanized stock in the mold by the use of cores, mechanically forcing the stock to shape under pressure, removing the cores, buffing the edges of the article while in the mold sockets, and uniting the shaped parts of the article and vulcanizing them in the same mold sockets.

14. The method of making hollow rubber articles consisting of shaping the article into two parts in mold cavities by the use of complementary mold cores, forcing unvulcanized stock in the cavities to shape, slightly vulcanizing the article parts while held under pressure, removing the cores and then uniting and vulcanizing the article while in the same cavities.

15. The method of making hollow rubber articles consisting of shaping the article in parts in mold cavities by the use of complementary mold cores, consisting of, first heating the mold members so that as the unvulcanized stock is forced to its seat and held, it becomes vulcanized to a slight degree sufficient to hold its shape, removing the core members, completing the vulcanization while held in the original cavities and simultaneously creating an internal pressure in the article.

16. The process of making hollow rubber articles from continuous flat sheet stock, consisting of forming the articles of two parts, each in mold cavities by the use of intermediate mold members having protuberances complimentary to the cavity pressed into the cavity by bringing the mold parts together upon the protuberances under pressure sufficient to firmly seat the formed parts in the cavity and to sheer the surplus rubber from around the cavities, heating the intermediate mold member to effect a slight vulcanization of the rubber stock removing the intermediate mold member and then removing the surplus rubber from around the mold cavities, buffing the edges of the formed parts placing a mixture which will produce a permanent gas into the formed parts, joining the formed parts together by mechanical pressure while in mold members and thereafter vulcanizing the hollow rubber article.

17. The process of making hollow rubber articles consisting of seating raw rubber stock in coacting mold members by the use of cores, forcing the stock to its seat, previously heating the mold members so that when the stock is forced to its seat under pressure it is caused to complete its formation and be vulcanized slightly, and thereafter removing the core members and the rubber "trim," placing a chemical pellet within one of the parts, bringing the parts together without removal from the cavities and then vulcanizing the article while in the same cavities.

18. The process of making hollow rubber articles consisting of shaping the article from unvulcanized stock by the use of mold and core members in which the core members are coated to prevent adhesion of the rubber stock thereto, fully forming and seating the stock in said core members, at the same time heating said stock to slightly vulcanize it and thereby fix its shape and removing the core members leaving the stock in the mold sockets by adhesion of the rubber thereto, bringing the formed parts together and completing vulcanization while in these same sockets.

19. An apparatus for making hollow rubber articles, consisting of cavitary mold members and core members, complementary thereto, adapted to force the rubber stock to its seat, and coacting means on the core members and mold members for severing the surplus stock from the parts formed in the cavities, and means for supplying heat to the mold members and core members.

20. In an apparatus of the character described, the combination of a pair of cavitary mold members, core members adapted to register with the cavities and force stock to its seat in the cavities completing its formation, and coacting means surrounding the cavities and core members for severing the surplus stock, means for conveying steam to the interior of the core members, said coacting means forming meeting edges to completely enclose the article after the core members are removed and the mold members brought together to unite the edges of the article.

21. An apparatus for forming hollow rubber articles, consisting of cavitary mold members, coacting core members to form raw rubber stock by mechanical pressure in the cavities, means for severing the surplus stock, and means for buffing the edges of the articles while in the cavities.

22. An apparatus for use in the manufacture of hollow rubber articles, consisting of a carrier for mold plates, a buffing roll mounted above the carrier and parallel therewith, and means for driving the buffing roll, whereby the carrier may move a roll beneath the buffing roll to treat articles in the mold.

23. A mold for forming hollow rubber articles, consisting of a pair of cavitary members, each having a plurality of cavities, a plurality of hollow core members coacting with the cavitary members and mounted in opposed relation on a movable plate, and means for bringing the cavitary members and core members together to form the stock, and firmly force it to its seat, there being means whereby heating fluid may flow to the interior of the core members.

24. A core member for forcing rubber stock to its seat in opposed cavities, consisting of a plate having a series of opposite protuberances, means for conducting heating fluid to the interior of the protuberances and means on the plate around the protuberances for severing the trim of the stock.

25. A pair of coacting mold members having cavities for the formation of parts of hollow rubber articles, a core member consisting of a plate having opposed protuberances, adapted to project into the cavities when the mold members and core members are brought together, means for conducting heating fluid to the interior of the protuberances there being cutting edges on all three members whereby the trim of the stock may be severed when being formed, the edges of the mold members meeting when the mold members are brought together.

26. A mold and core for forming hollow rubber articles consisting of a pair of cavity members and an intermediate core member having protuberances complementary to the molds, cutting edges on the core member and cavity member for first severing the trim and cutting edges on the cavity members, being flat to provide meeting surfaces of substantial width when the mold members are brought together, and there being a conduit in the interior of the intermediate member whereby heating fluid may be conducted to the interior.

27. A mold and core member for forming hollow rubber articles, consisting of a hemispherical cavity and a hemispherical core, slightly smaller than the cavity, a cutting edge formed around the cavity and a cutting edge formed around the base of the core and slightly spaced therefrom by a channel, said edges being adapted to meet when these parts are brought together to form an article, there being means for conducting heating fluid to the interior of the core.

28. The method of making permanently inflated hollow rubber articles consisting of slightly vulcanized rubber composition while mechanically forming the walls of the article under pressure in mold cavities and while holding the formed parts of the article in mold cavities, introducing a chemical composition before uniting the parts, then uniting the formed parts by mechanical pressure and vulcanizing the joined parts, thereby producing permanent inflation from the chemical composition.

In testimony whereof, I hereunto affix my signature.

FRED THOMAS ROBERTS.